US007543392B2

(12) United States Patent
Kwon et al.

(10) Patent No.: US 7,543,392 B2
(45) Date of Patent: Jun. 9, 2009

(54) MOTION ESTIMATION METHOD AND SYSTEM FOR MOBILE BODY

(75) Inventors: Woong Kwon, Gyeonggi-do (KR); Kyung-shik Roh, Gyeonggi-do (KR); Woo-sup Han, Gyeonggi-do (KR); Young-bo Shim, Seoul (KR); Boldyrev Serguei, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 794 days.

(21) Appl. No.: 10/982,909

(22) Filed: Nov. 8, 2004

(65) Prior Publication Data

US 2005/0125108 A1 Jun. 9, 2005

(30) Foreign Application Priority Data

Nov. 8, 2003 (KR) ............... 10-2003-0078873

(51) Int. Cl.
*G01C 19/00* (2006.01)
*G01C 25/00* (2006.01)

(52) U.S. Cl. ............... 33/320; 33/316; 33/319; 33/272; 33/357; 73/1.75; 73/1.76; 73/1.77; 434/186; 701/224

(58) Field of Classification Search ............ 33/272, 33/316, 319, 320, 322, 357; 73/1.75, 1.77, 73/1.78; 434/186; 701/224; 702/72, 73
See application file for complete search history.

(56) References Cited

U.S. PATENT DOCUMENTS 2,393,670 A   1/1946 White
4,429,469 A * 2/1984 Tsushima et al. ......... 33/361

(Continued)

FOREIGN PATENT DOCUMENTS

EP   0 519 630 A2   12/1992

(Continued)

OTHER PUBLICATIONS

Abousalem M A et al.; "A quality control approach for GPS-based automatic vehicle location and navigation systems", Vehicle Navigation and Information Systems Conference, 1993, Proceedings of the IEEE-IEE Ottawa, Ont., Canada Oct. 12-15, 1993, New York, NY, USA, IEEE, Oct. 12, 1993, pp. 466-471.

(Continued)

*Primary Examiner*—Thomas G Black
*Assistant Examiner*—Lin B Olsen
(74) *Attorney, Agent, or Firm*—Buchanan Ingersoll & Rooney PC

(57) ABSTRACT

A motion estimation method and system for a mobile body are provided. The method includes: obtaining magnetic field information from compass information of the mobile body; comparing the magnetic field of the mobile body with a predetermined value and determining whether a position of the mobile body belongs to a specific region according to the comparison result; and estimating a direction of the mobile body by determining whether a compass azimuth angle is used for direction estimation of the mobile body according to the determination result. The system, in which a gyro, odometers, and compasses are installed, comprises: a magnetic field calculator calculating the magnitudes of magnetic fields of the mobile body; a magnetic field comparator obtaining differences between the magnitudes of the magnetic fields and the magnitude of the geomagnetic field and comparing the differences with the first threshold value; a geomagnetic region determiner determining whether a position where the mobile body exists belongs to a region where the geomagnetism works according to the comparison result; and a moving direction estimator estimating a moving direction of the mobile body by determining whether or not to use azimuth angles of the compasses for direction estimation of the mobile body according to the determination result.

14 Claims, 7 Drawing Sheets

U.S. PATENT DOCUMENTS

| | | | |
|---|---|---|---|
| 4,734,863 A | | 3/1988 | Honey et al. |
| 5,307,277 A | * | 4/1994 | Hirano .................. 701/207 |
| 5,327,348 A | * | 7/1994 | Kato ..................... 701/207 |
| 7,168,177 B2 | * | 1/2007 | Kwon et al. ............. 33/361 |
| 7,225,552 B2 | * | 6/2007 | Kwon et al. ............. 33/356 |
| 2003/0041466 A1 | * | 3/2003 | Kato ..................... 33/356 |
| 2007/0101596 A1 | * | 5/2007 | Olson et al. ............. 33/356 |

FOREIGN PATENT DOCUMENTS

| | | |
|---|---|---|
| JP | 61-258112 | 11/1986 |
| JP | 11-083532 | 3/1999 |
| KR | 1999-0075794 | 10/1999 |

OTHER PUBLICATIONS

Korean Office Action dated Aug. 19, 2005.

Japanese Office Action dated Feb. 19, 2008.

Chinese Office Action dated Mar. 28, 2008 with English translation.

* cited by examiner

MOTION ESTIMATION METHOD AND SYSTEM FOR MOBILE BODY

BACKGROUND OF THE INVENTION

This application claims the priority of Korean Patent Application No. 2003-78873, filed on Nov. 8, 2003, in the Korean Intellectual Property Office, the disclosure of which is incorporated herein in its entirety by reference.

1. Field of the Invention

The present invention relates to motion estimation of a mobile body, and more particularly, to a motion estimation method and system for a mobile body using compass data.

2. Description of the Related Art

Pose estimation of a mobile body is achieved by estimating a position and an orientation of the mobile body using an absolute sensor or a relative sensor. Pose estimation of a mobile body moving on a 2-dimensional plane as shown in FIG. 1 is achieved by estimating the position (x, y) and the direction θ of the mobile body. In this case, the said absolute sensor can measure the absolute position or orientation of the mobile body instead of its relative motion. A camera, a laser scanner, sonar sensors, a global positioning systems (GPS), or a magnetic compass can be used as an absolute sensor. On the other hand, the said relative sensor can measure a position or an orientation by measuring and integrating a relative increments or decrements value of the motion of the mobile body. A gyro, an accelerometer, and an odometer (an encoder attached to a motor) can be used as the relative sensor.

Some of the characteristics of the absolute sensors are as follows: the camera is sensitive to a lighting status of surrounding environments and has a high possibility of outputting unreliable data; the laser scanner can output reliable data but is very expensive, and if a number of obstacles exist, it is difficult to measure a position or an orientation using the laser scanner; the sonar has low data accuracy; the GPS can be used only outside and has low precision; and the compass has a high possibility of being affected by a disturbance of magnetic field existing indoors. On the other hand, since the relative sensors measure only a variable value, an integration error is inevitably generated by integrating the variable value, and a drift error characteristics of the gyro and the accelerometer cannot be avoided. In an embodiment of the present invention, the disadvantages described above are reduced by sensor fusion using a compass as an absolute sensor and a gyro and an odometer as relative sensors.

A conventional dead-reckoning pose estimation method is classified into a method using only an odometer, a method using a gyro and an odometer, and a method using a compass and an odometer. The method using only the odometer is the simplest one. However, the method using only the odometer cannot cope with a slippage error, a bump collision, or kidnapping. Also, since errors are continuously accumulated in this method, an unbounded error exists.

To solve the problems described above, a method of performing dead-reckoning by using a gyro and an odometer has been developed. However, even though this method can obtain a more accurate result as compared with the method using only the odometer, i.e., the encoder, since both the encoder and the gyro are relative sensors, boundedness cannot be still guaranteed in long-term. A method of stably detecting a moving direction in long-term by introducing the compass, which is the absolute sensor, instead of the gyro also has been developed. However, since this method can easily be affected by a disturbance of magnetic field always existing in a home or office environment, it is difficult to practically use the method.

Recently, a method using a gyro, a compass, and an odometer together has also been suggested. Since this method simultaneously uses a gyro and a compass, mutual-aid between the gyro and the compass is possible. However, since most currently developed methods use the existing Kalman filter, which is a statistics-based sensor fusion method, various limitations originating from inherent demerit of Kalman filter exist. That is, since system noise and measurement noise must have Gaussian white noise characteristics for the application of Kalman filter, it is difficult to deal with various kinds of situations such as a magnetic field, an obstacle, and a slippery floor, which don't show Gaussian white noise characteristics. Besides, exact information of all kinds of models of sensors is necessary, and an assumption that error sources are uncorrelated to each other is also needed. However, practically, a method and system meeting the requirements described above cannot be realized. Also, since the performance of the sensors are important for sensor fusion, expensive sensors are mostly used in this method.

SUMMARY OF THE INVENTION

The present invention provides a motion estimation method and system for a mobile body, which use sensor fusion to calculate pose information of the mobile body by accurately and robustly estimating an orientation of the mobile body.

The present invention also provides a computer readable medium having recorded thereon a computer readable program for performing the motion estimation method for a mobile body.

According to an aspect of the present invention, there is provided a motion estimation method for a mobile body, the method comprising: obtaining magnetic field information from the magnetic compasses attached to the mobile body; comparing the magnetic field of the mobile body with a predetermined value and determining whether a position of the mobile body belongs to a specific region according to the comparison result; and estimating a moving direction of the mobile body by determining whether a compass azimuth angle is used for estimating the orientation of the mobile body according to the determination result.

Here, the predetermined value can be the magnitude of the geomagnetic field, and the specific region can be a region in which the Earth's magnetic field works dominantly. The determination of whether a position of the mobile body belongs to a specific region can comprise: if two compasses are installed in the mobile body, comparing each of the magnitude of a magnetic field of the first compass and the magnitude of a magnetic field of the second compass with the magnitude of the geomagnetic field, dividing the comparison results into a case where both differences are less than a first threshold value, a case where only one of the two differences is less than the first threshold value, and a case where the two differences are not less than the first threshold value, and determining whether a position of the mobile body belongs to the specific region according to the comparison results.

The estimating of the moving direction of the mobile can comprise: if it is determined that the compass information is valid according as the mobile body belongs to a specific region, obtaining a final compass azimuth angle and estimating a heading angle using a Kalman filter using the final compass azimuth angle as a measurement input; and if it is determined that the compass information is invalid according as the mobile body does not belong to a specific region, comparing an angular velocity of a gyro and an angular velocity of an odometer, and if the difference is less than a second threshold value, estimating a heading direction using the Kalman filter using a moving direction obtained by the odometer as a measurement input, and if the difference is not less than the second threshold value, estimating the moving direction by integrating the angular velocity of the gyro.

The estimating of the moving direction of the mobile body in the case where each of the magnitude of the magnetic field of the first compass and the magnitude of the magnetic field of the second compass is compared with the magnitude of the geomagnetic field and the two differences are less than the first threshold value can comprise: obtaining a difference between an azimuth angle of the first compass and an azimuth angle of the second compass; if the difference between the azimuth angles is less than a third threshold value, obtaining a compass azimuth angle of the mobile body by varying a weight according to differences between the magnitudes of the magnetic fields of the two compasses and the magnitude of the geomagnetic field; and if the difference between the azimuth angles is not less than the third threshold value, obtaining a difference between an angular velocity of the gyro with respect to the mobile body and each angular velocity with respect to the azimuth angles of the compasses and obtaining the compass azimuth angle of the mobile body according to the magnitudes of the differences.

The obtaining of the compass azimuth angle of the mobile body by varying a weight can comprise: when $\Delta\theta_{c1}$ indicates the amount of how much an azimuth angle of the first compass is changed for a sampling period, $\Delta\theta_{c2}$ indicates the amount of how much an azimuth angle of the second compass is changed for the sampling period, $\omega_g$ indicates an angular velocity of the gyro, $\Delta t$ indicates a sampling time, $\Delta H_{1E}$ indicates a difference between the magnitude of a magnetic field of the first compass and the magnitude of the geomagnetic field, and $\Delta H_{2E}$ indicates a difference between the magnitude of a magnetic field of the second compass and the magnitude of the geomagnetic field, if a value obtained by multiplying $\Delta H_{1E}$ by $\Delta H_{2E}$ is a negative number, determining a value obtained by calculating Formula 3 as a final compass azimuth angle $\theta_c$; if the value obtained by multiplying $\Delta H_{1E}$ by $\Delta H_{2E}$ is a positive number, determining a value obtained by calculating Formula 4 as the final compass azimuth angle $\theta_c$; and if the value obtained by multiplying $\Delta H_{1E}$ by $\Delta H_{2E}$ is 0, determining a value obtained by calculating Formula 5 as the final compass azimuth angle $\theta_c$. The obtaining of the compass azimuth angle of the mobile body by obtaining the differences between the angular velocities can comprise: when $\Delta\theta_{c1}$ indicates the amount of how much an azimuth angle of the first compass is changed for a sampling period, $\Delta\theta_{c2}$ indicates the amount of how much an azimuth angle of the second compass is changed for the sampling period, $\omega_g$ indicates an angular velocity of the gyro, and $\Delta t$ indicates a sampling time, if the difference between an azimuth angle of the first compass $\theta_{c1}$ and an azimuth angle of the second compass $\theta_{c2}$ is not less than the third threshold value, checking whether or not to satisfy Formula 6; if Formula 6 is satisfied, determining the azimuth angle of the first compass $\theta_{c1}$ as the final compass azimuth angle $\theta_c$; if Formula 6 is not satisfied and Formula 7 is satisfied, determining the azimuth angle of the second compass $\theta_{c2}$ as the final compass azimuth angle $\theta_c$; and if both sides of each of Formula 6 and Formula 7 are the same, determining the value obtained by calculating Formula 5 as the final compass azimuth angle, i.e., the moving direction angle of the mobile body, $\theta_c$.

$$\theta_c \leftarrow \frac{\theta_{c1}|\Delta H_{2E}| + \theta_{c2}|\Delta H_{1E}|}{|\Delta H_{1E}| + |\Delta H_{2E}|} \quad \text{[Formula 3]}$$

$$\theta_c \leftarrow \frac{\theta_{c1}\Delta H_{2E} - \theta_{c2}\Delta H_{1E}}{\Delta H_{1E} - \Delta H_{2E}} \quad \text{[Formula 4]}$$

$$\theta_c \leftarrow \frac{\theta_{c1} + \theta_{c2}}{2} \quad \text{[Formula 5]}$$

$$\left|\frac{\Delta\theta_{c1}}{\Delta t} - \omega_g\right| < \left|\frac{\Delta\theta_{c2}}{\Delta t} - \omega_g\right| \quad \text{[Formula 6]}$$

-continued $$\left|\frac{\Delta\theta_{c2}}{\Delta t} - \omega_g\right| < \left|\frac{\Delta\theta_{c1}}{\Delta t} - \omega_g\right| \quad \text{[Formula 7]}$$

The estimating of the moving direction of the mobile body in the case where each of the magnitude of the magnetic field of the first compass and the magnitude of the magnetic field of the second compass is compared with the magnitude of the geomagnetic field and only one of the two differences is less than the first threshold value can comprise: determining an azimuth angle of the compass having the difference less than the first threshold value as the final compass azimuth angle.

The estimating of the moving direction of the mobile body in the case where each of the magnitude of the magnetic field of the first compass and the magnitude of the magnetic field of the second compass is compared with the magnitude of the geomagnetic field and the two differences are not less than the first threshold value can comprise: calculating an angular velocity with respect to wheel velocities of the mobile body (that is, an angular velocity obtained by the odometers) without using the compass information; obtaining a difference between a gyro angular velocity of the mobile body and the wheel angular velocity; if the difference is less than a second threshold value, estimating an optimum moving direction angle using a Kalman filter using a direction obtained by the odometer as a measurement input; and if the difference is not less than the second threshold value, estimating the moving direction angle by integrating the gyro angular velocity without using the Kalman filter. The estimating of the moving direction angle by integrating the gyro angular velocity can further comprise: if the estimating is performed more than second threshold times within a predetermined time, ending the operation.

The method can further comprise: calculating an optimum moving direction estimation value of the mobile body by filtering a moving direction angle of the mobile body using the Kalman filter feedbacking an error status.

According to another aspect of the present invention, there is provided a motion estimation system for a mobile body in which a gyro, odometers, and compasses are installed, the system comprising: a magnetic field calculator calculating the magnitudes of magnetic fields of the mobile body in which the compasses are installed; a magnetic field comparator obtaining differences between the magnitudes of the magnetic fields and the magnitude of the geomagnetic field and comparing the differences with the first threshold value; a geomagnetic region determiner determining whether a position of the mobile body belongs to a region where the geomagnetism works according to the comparison result; and a moving direction estimator estimating a moving direction of the mobile body by determining whether or not to use azimuth angles of the compasses for direction estimation of the mobile body according to the determination result.

According to another aspect of the present invention, there is provided a computer readable medium having recorded thereon a computer readable program for performing the method described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown.

Roll and pitch of a mobile body can be exactly calculated using an accelerometer and a gyro. However, it is known that it is very difficult to obtain the yaw of a mobile body. In embodiments of the present invention, a moving direction of a mobile body is estimated using a new sensor fusion system, which can calculate pose information of the mobile body by accurately and robustly estimating the moving direction of the mobile body. That is, a position and an orientation of the mobile body is optimally estimated by combining absolute sensors and relative sensors such as compasses, a gyro and odometers, effectively dealing with various uncertain environments such as magnetic fields, obstacles, and slippery floors, and obtaining a yaw angle of the mobile body.

Figure 1:
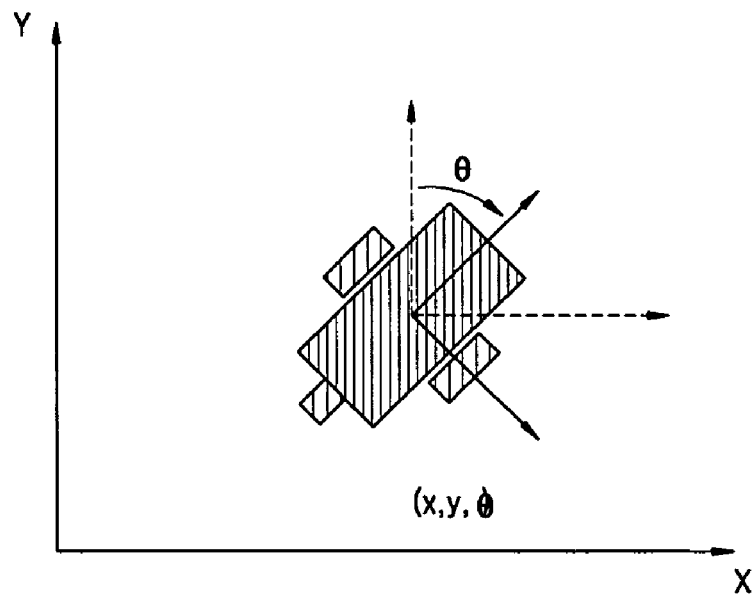
FIG. 1 shows a mobile body moving on a two-dimensional plane for estimating a position (x, y) and a direction θ.
Figure 2:
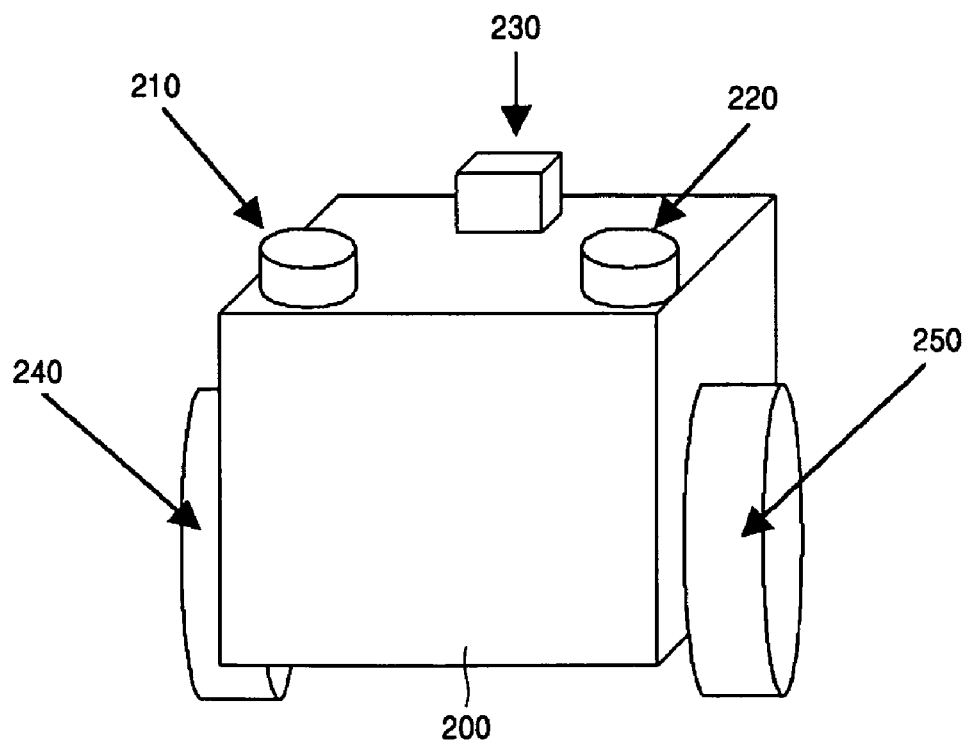
FIG. 2 is a conceptual diagram of a sensor fusion system installed in a mobile body for estimating a moving direction of the mobile body according to an embodiment of the present invention.

FIG. 2 is a conceptual diagram of a sensor fusion system installed in a mobile body for estimating a moving direction of the mobile body according to an embodiment of the present invention.

Referring to FIG. 2, the mobile body 200 includes two compasses 210 and 220, a gyro 230, and two wheel encoders (odometers) 240 and 250.

The sensors have the following characteristics. The gyro 230 generates an integration error in an integrating process required for calculating a bias drift error and an angle value in a long-term. However, the gyro 230 can detect a relatively accurate angle value in a short-term. Since the compasses 210 and 220 can provide an absolute azimuth angle in a long-term, accurate information can be obtained using the compasses 210 and 220. However, the compasses 210 and 220 can generates errors due to magnetic disturbances existing in life environments in a short-term. On the other hand, the odometers 240 and 250 installed in driving parts (wheels in a case of a mobile body) of the mobile body show an unbounded error characteristic in a long-term since an error due to slippage and an error due to kinematic conditions, such as a wheel size and whether alignment is performed, are accumulated. The odometers 240 and 250 also have such limitation that cannot deal with an unexpected situation such as a bump collision and kidnapping in a short-term. However, the odometers 240 and 250 provide relatively accurate information during most of the time.

A direction and magnitude of a magnetic field can be obtained from the compasses 210 and 220. An angular velocity can be detected using the gyro 230. An angular velocity of the mobile body can be obtained by detecting rotation velocities of the wheels using the odometers 240 and 250.

In embodiments of the present invention, a rule-based indirect Kalman filter is used for optimally estimating a position and an orientation of the mobile body by combining the absolute sensors and relative sensors such as compasses, a gyro, and odometers, effectively dealing with various uncertain environments such as magnetic fields, obstacles, and slippery floors, and obtaining a yaw angle of the mobile body.

Figure 3:
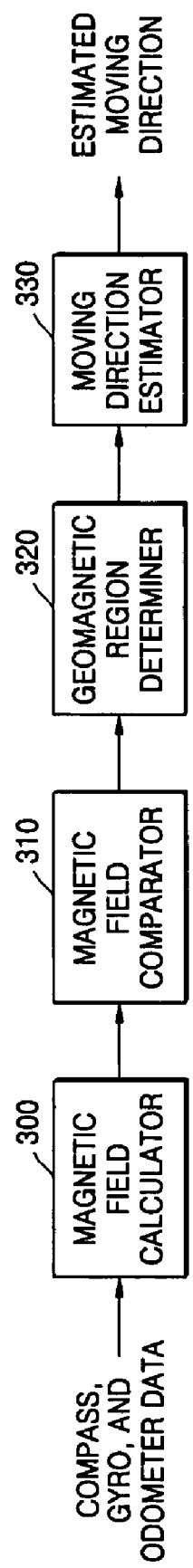
FIG. 3 is a block diagram of a motion estimation system for a mobile body according to an embodiment of the present invention.

FIG. 3 is a block diagram of a motion estimation system for a mobile body according to an embodiment of the present invention.

Referring to FIG. 3, the motion estimation system for a mobile body includes a magnetic field calculator 300, a magnetic field comparator 310, a geomagnetic region determiner 320, and a moving direction estimator 330. A gyro, odometers, and compasses are installed in the mobile body.

The mobile body obtains sensor data from the compasses, the gyro, and the odometers. The magnitude of a magnetic field can be obtained from compass information. The magnetic field calculator 300 calculates the magnitudes of the magnetic fields of the mobile body in which the compasses are installed. The magnetic field comparator 310 obtains differences between the magnitudes of the magnetic fields and the magnitude of the geomagnetic field and compares the differences with a first threshold value $\epsilon_H$. The geomagnetic region determiner 320 determines whether a position of the mobile body belongs to a region where the geomagnetism works according to the comparison result. The moving direction estimator 330 estimates a moving direction of the mobile body by determining whether or not to use a compass azimuth angle for direction estimation of the mobile body according to the determination result. As the comparison result of differences between the magnitudes of the magnetic fields obtained from the two compasses and the magnitude of the geomagnetic field, which is obtained by the magnetic field comparator 310, if at least one of the differences is less than the first threshold value $\epsilon_H$, an azimuth angle obtained from the compass data is used for estimating the moving direction of the mobile body. Otherwise, angular velocities of the gyro and the odometers are used for estimating the moving direction of the mobile body. The motion estimation of the mobile body will now be described in more detail with reference to the accompanying drawings.

Figure 4:
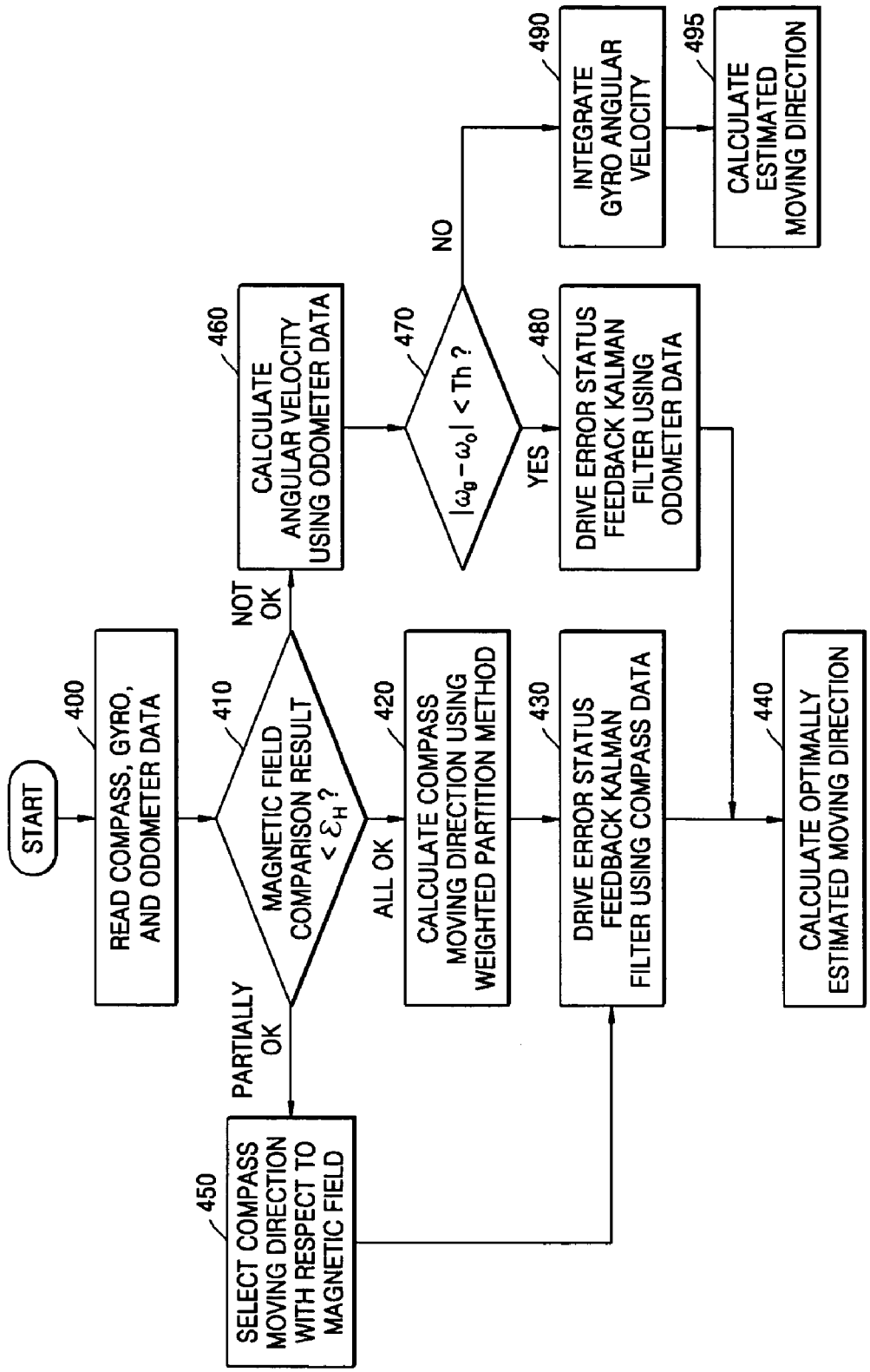
FIG. 4 is a flowchart of a motion estimation method for a mobile body according to an embodiment of the present invention.

FIG. 4 is a flowchart of a motion estimation method for a mobile body according to an embodiment of the present invention.

Figure 5:
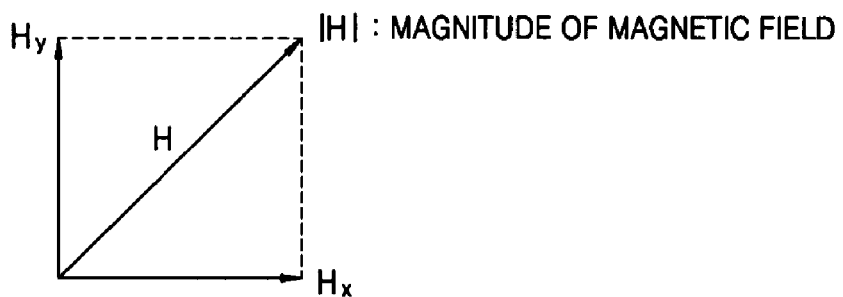
FIG. 5 illustrates an example of obtaining a magnitude of a magnetic field from compass information.

Sensor data of compasses, a gyro, and odometers is read in operation 400. First, the magnitude of each magnetic field from compass data of the sensor data is obtained. FIG. 5 illustrates an example of obtaining the magnitude of a magnetic field from compass information. Referring to FIG. 5, the magnitude of the magnetic field |H| can be obtained from an x-axis component magnetic field $H_x$ and a y-axis component magnetic field $H_y$, which can be obtained from each compass.

Now, a difference between the magnitude of each magnetic field obtained from each compass and the magnitude of the geomagnetic field is defined as shown in Formula 1, where $\Delta H_{iE}$ indicates the difference, i indicates an identifier of a compass, and $H_E$ indicates the geomagnetic field.

$$\Delta H_{iE} = |H_i| - H_E|  \qquad \text{[Formula 1]}$$

Formula 2 is defined.

$$\text{If } |\Delta H_{iE}| < \epsilon_H, H_i \in S_H \qquad \text{[Formula 2]}$$

where $\epsilon_H$ indicates a threshold value and $S_H$ indicates a success region, that is, a region where the geomagnetic field works.

Figure 6:
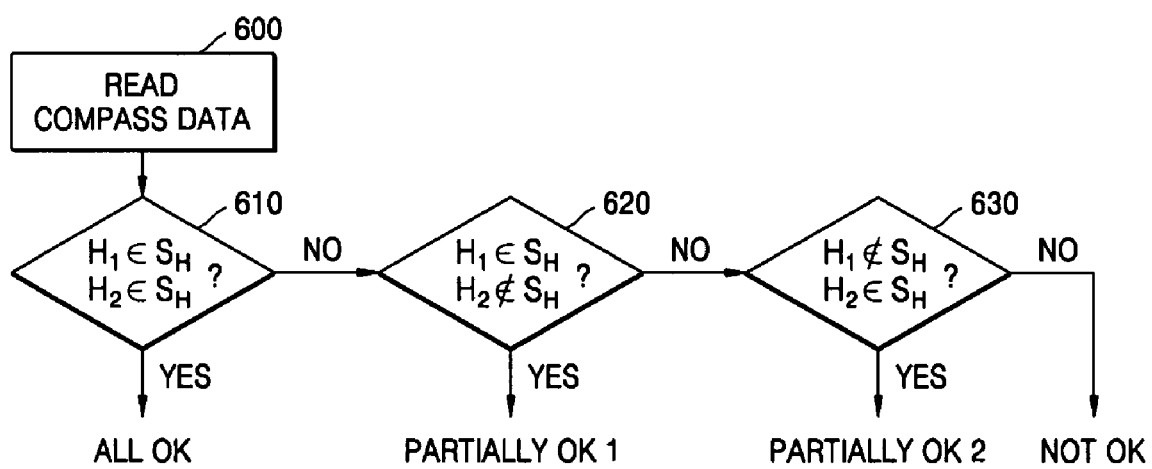
FIG. 6 is a flowchart illustrating whether $H_1$ and $H_2$ obtained by a first compass and a second compass belong to $S_H$.

After Formulas 1 and 2 are defined, $H_1$ and $H_2$ are obtained from a first compass and a second compass as shown in FIG. 6 in operation 600, and it is checked whether $H_1$ and $H_2$ belong to $S_H$ in operation 410.

Figure 7:
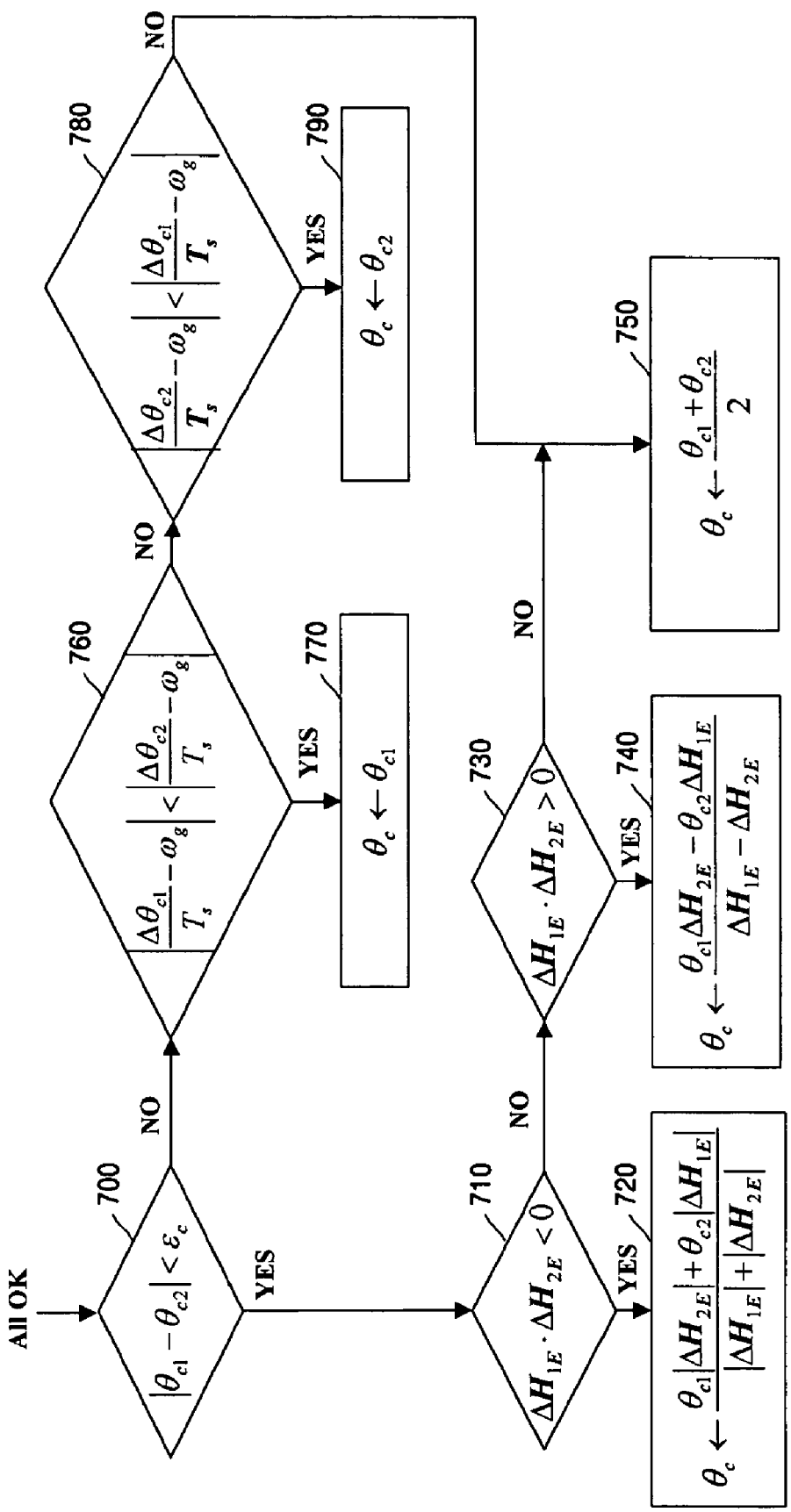
FIG. 7 is a flowchart of a process of calculating a moving direction of a mobile body using a weighted partition method.

Each of the magnitude of the magnetic field of the first compass $|H_1|$ and the magnitude of the magnetic field of the second compass $|H_2|$ is compared with the magnitude of the geomagnetic field $|H_E|$, and if both differences are less than the first threshold value $\epsilon_H$ in operation 610, a final compass azimuth angle is calculated using a weighted partition method as shown in FIG. 7 in operation 420. A difference between an azimuth angle of the first compass $\theta_{c1}$ and an azimuth angle of the second compass $\theta_{c2}$ is obtained in operation 700. If the azimuth angle difference is less than a third threshold value $\epsilon_c$, a compass azimuth angle of the mobile body is obtained by varying a weight according to the differences between the magnitudes of the magnetic fields of the compasses and the magnitude of the geomagnetic field. That is, if a value obtained by multiplying $\Delta H_{1E}$ and $\Delta H_{2E}$ is a negative number in operation 710, a value obtained by Formula 3 is determined as the final compass azimuth angle $\theta_c$ in operation 720.

$$\theta_c \leftarrow \frac{\theta_{c1} |\Delta H_{2E}| + \theta_{c2} |\Delta H_{1E}|}{|\Delta H_{1E}| + |\Delta H_{2E}|} \qquad \text{[Formula 3]}$$

If the value obtained by multiplying $\Delta H_{1E}$ and $\Delta H_{2E}$ obtained in operation 610 is a positive number in operation 730, a value obtained by Formula 4 is determined as the final compass azimuth angle $\theta_c$ in operation 740.

$$\theta_c \leftarrow \frac{\theta_{c1} \Delta H_{2E} - \theta_{c2} \Delta H_{1E}}{\Delta H_{1E} - \Delta H_{2E}} \qquad \text{[Formula 4]}$$

If the value obtained by multiplying $\Delta H_{1E}$ and $\Delta H_{2E}$ obtained in operation 610 is 0, a value obtained by Formula 5 is determined as the final compass azimuth angle $\theta_c$ in operation 750.

$$\theta_c \leftarrow \frac{\theta_{c1} + \theta_{c2}}{2} \qquad \text{[Formula 5]}$$

On the other hand, if the difference between the azimuth angle of the first compass $\theta_{c1}$ and the azimuth angle of the second compass $\theta_{c2}$ is not less than the third threshold value $\epsilon_c$ in operation 700, it is checked whether Formula 6 is satisfied in operation 760.

$$\left| \frac{\Delta \theta_{c1}}{\Delta t} - \omega_g \right| < \left| \frac{\Delta \theta_{c2}}{\Delta t} - \omega_g \right| \qquad \text{[Formula 6]}$$

If Formula 6 is satisfied in operation 760, the azimuth angle of the first compass $\theta_{c1}$ is determined as the final compass azimuth angle $\theta_c$ in operation 770. If Formula 6 is not satisfied in operation 760 and Formula 7 is satisfied in operation 780, the azimuth angle of the second compass $\theta_{c2}$ is determined as the final compass azimuth angle $\theta_c$ in operation 790.

$$\left| \frac{\Delta \theta_{c2}}{\Delta t} - \omega_g \right| < \left| \frac{\Delta \theta_{c1}}{\Delta t} - \omega_g \right| \qquad \text{[Formula 7]}$$

If both sides of Formulas 6 and 7 are the same in operations 760 and 780, the value obtained by Formula 5 is determined as the final compass azimuth angle $\theta_c$ as in operation 750.

In Formulas 3 through 7, $\Delta \theta_{c1}$ indicates the amount of how much an azimuth angle of the first compass is changed for a sampling period, $\Delta \theta_{c2}$ indicates the amount of how much an azimuth angle of the second compass is changed for the sampling period, $\omega_g$ indicates an angular velocity of the gyro, $\Delta t$ indicates a sampling time.

Figure 8:
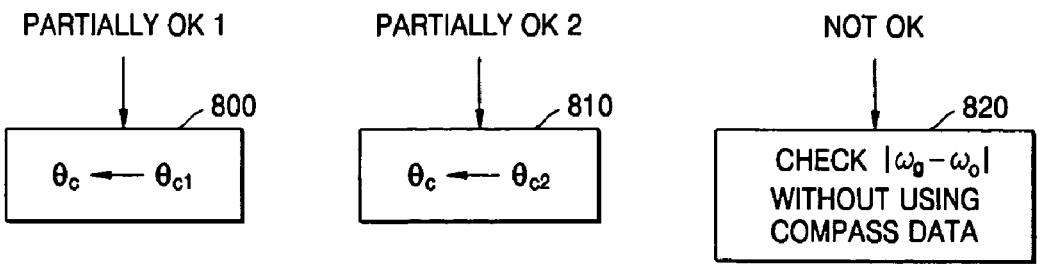
FIG. 8 is a flowchart of a process of determining a moving direction of the mobile body in a case where not both differences between the magnitudes of the magnetic fields of the compasses and the magnitude of the geomagnetic field obtained in FIG. 4 are less than a first threshold value.

Operation 450 of FIG. 4 will be described in detail with reference to FIGS. 6 and 8. In FIG. 6, in a case where each of the magnitude of the magnetic field of the first compass $|H_1|$ and the magnitude of the magnetic field of the second compass $|H_2|$ is compared with the magnitude of the geomagnetic field $|H_E|$, the difference between the magnitude of the magnetic field of the first compass $|H_1|$ and the magnitude of the geomagnetic field $|H_E|$ is less than the first threshold value $\epsilon_H$, and the difference between the magnitude of the magnetic field of the second compass $|H_2|$ and the magnitude of the geomagnetic field $|H_E|$ is not less than the first threshold value $\epsilon_H$ in operation 620, as shown in FIG. 8, the azimuth angle of the first compass $\Delta \theta_{c1}$ is determined as the final compass azimuth angle $\theta_c$ as in operation 800.

Also, in FIG. 6, in a case where each of the magnitude of the magnetic field of the first compass $|H_1|$ and the magnitude of the magnetic field of the second compass $|H_2|$ is compared with the magnitude of the geomagnetic field $|H_E|$, the difference between the magnitude of the magnetic field of the first compass $|H_1|$ and the magnitude of the geomagnetic field $|H_E|$ is not less than the first threshold value $\epsilon_H$, and the difference between the magnitude of the magnetic field of the second compass $|H_2|$ and the magnitude of the geomagnetic field $|H_E|$ is less than the first threshold value $\epsilon_H$ in operation 630, the azimuth angle of the second compass $\Delta \theta_{c2}$ is determined as the final compass azimuth angle $\theta_c$ as in operation 810.

An error status feedback Kalman filter is driven using the final compass azimuth angle $\theta_c$ obtained by the method described above in operation 430, and an optimally estimated moving direction is obtained using the error status feedback Kalman filter in operation 440.

On the other hand, in FIG. 6, in a case where each of the magnitude of the magnetic field of the first compass $|H_1|$ and the magnitude of the magnetic field of the second compass $|H_2|$ is compared with the magnitude of the geomagnetic field $|H_E|$ and both the differences are not less than the first threshold value $\epsilon_H$ in operations 410 and 630, compass data is not used, and a difference between a gyro angular velocity and an odometer angular velocity is checked in operations 460 and 820.

Figure 9:
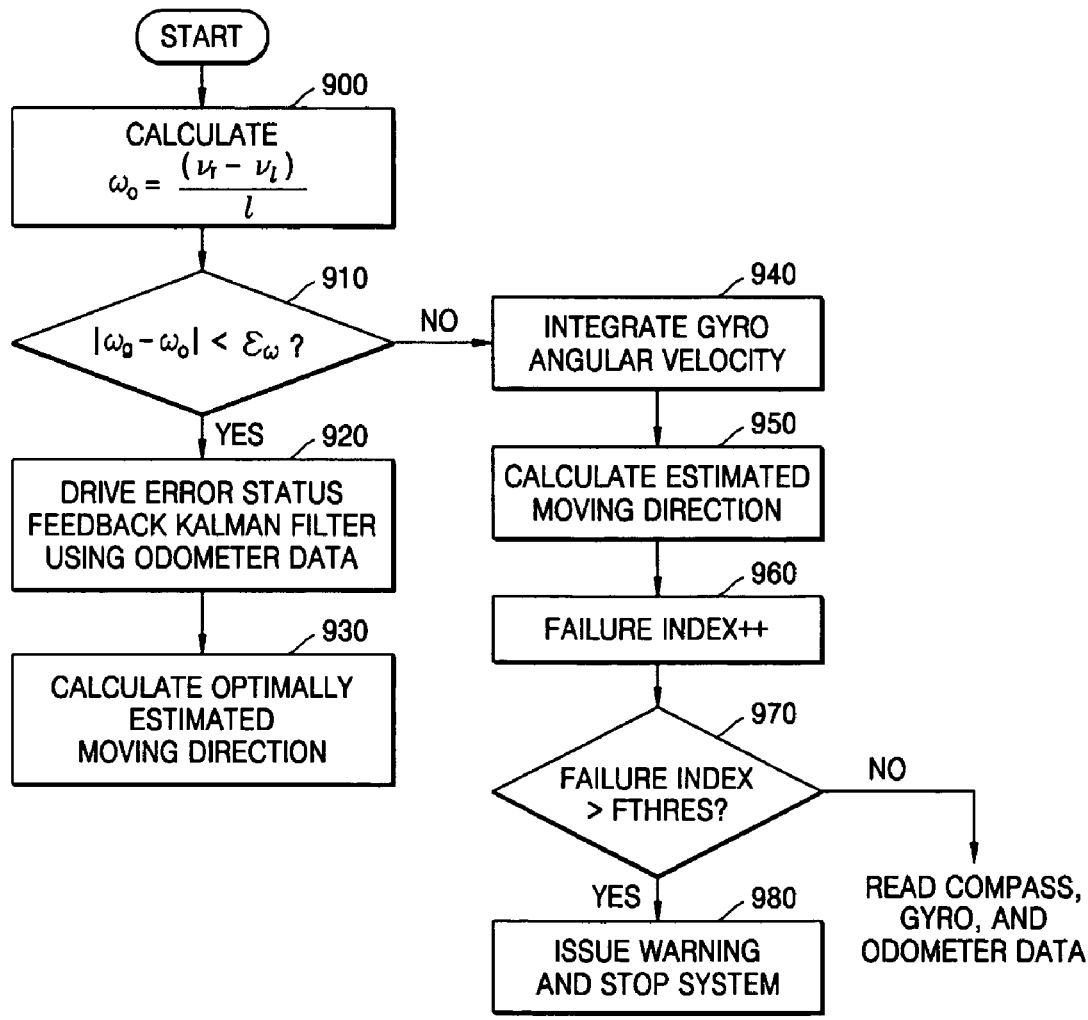
FIG. 9 is a flowchart of a process of estimating a moving direction of the mobile body by checking angular velocities of a gyro and odometers.

Operations 460 through 495 of FIG. 4 will be described in detail with reference to FIG. 9. FIG. 9 is a flowchart of a process of estimating a moving direction of the mobile body by checking angular velocities of the gyro and odometers.

First, an odometer angular velocity $\omega_o$ is obtained from the odometers as shown in Formula 8 in operation 900.

$$\omega_o = \frac{(v_r - v_l)}{l} \qquad \text{[Formula 8]}$$

where $V_r$ and $v_l$ indicate wheel velocities and l indicates a tread length, i.e., a distance between two wheels.

It is checked whether a difference between the gyro angular velocity $\omega_g$ and the odometer angular velocity $\omega_o$ is less than a second threshold value $\epsilon_\omega$ in operation 910, and if the difference is less than the second threshold value $\epsilon_\omega$, the error status feedback Kalman filter is driven using the odometer data in operation 920, and an optimally estimated moving direction is obtained using the error status feedback Kalman filter in operation 930.

Also, if the difference is not less than the second threshold value $\epsilon_\omega$ as the check result of operation 910, the Kalman filter is not used, and the gyro angular velocity is integrated in operation 940 and a suboptimal moving direction is calculated in operation 950. A failure index value is increased in operation 960, and if the failure index value exceeds a fourth threshold value in operation 970, a warning signal is issued and system operation is stopped in operation 980. If the failure index value is equal to or less than the fourth threshold value in operation 970, sensor data of the compasses, the gyro, and the odometers is read.

Modeling of odometers and a mobile body corresponding to an example of the mobile body can be performed as follows.

Figure 10:
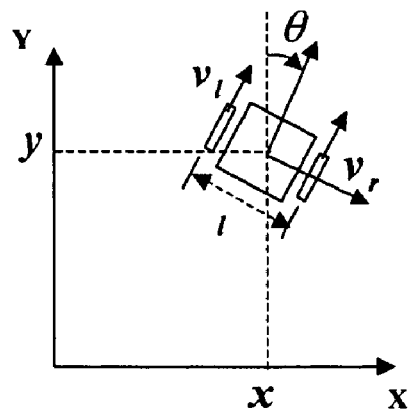
FIG. 10 shows a position of a mobile body on a two-dimensional plane.

FIG. 10 shows a position of a mobile body on a two-dimensional plane. When $t_s$ indicates a sampling time, the mobile body is modeled as shown in Formula 9.

$$\begin{pmatrix} x(t_{k+1}) \\ y(t_{k+1}) \\ \theta(t_{k+1}) \end{pmatrix} = \begin{pmatrix} x(t_k) \\ y(t_k) \\ \theta(t_k) \end{pmatrix} + \begin{pmatrix} \frac{(v_r(t_k) + v_l(t_k))}{2} \cdot \Delta t \cdot \cos\theta(t_k) \\ \frac{(v_r(t_k) + v_l(t_k))}{2} \cdot \Delta t \cdot \sin\theta(t_k) \\ \frac{(v_r(t_k) - v_l(t_k))}{l} \cdot \Delta t \end{pmatrix} \qquad \text{[Formula 9]}$$

Also, when $D_{l,r}$ indicates a diameter of a wheel, $C_e$ indicates an encoder resolution, which is the number of pulses per one rotation of the wheel, n indicates a gear ratio, and $N_{l,r}$ indicates the number of pulses within a sampling period, the odometers are modeled as shown in Formula 10.

$$v_{l,r} = \frac{\pi D_{l,r}}{n C_e} \cdot \frac{N_{l,r}}{t_s} \qquad \text{[Formula 10]}$$

Accordingly, an odometer angular velocity is represented as shown in Formula 11.

$$\omega_o(t_k) = \frac{(v_r(t_k) - v_l(t_k))}{l} \qquad \text{[Formula 11]}$$

Modeling of a gyro is performed as follows. First, when $\theta$ indicates a moving direction of the mobile body, b indicates a gyro drift rate, $\omega_g$ indicates a gyro output, $n_\theta$ indicates Gaussian white noise having distribution $\sigma_\theta$, and $n_b$ indicates Gaussian white noise having distribution $\sigma_b$, a gyro actual model can be represented as shown in Formula 12.

$$\begin{bmatrix} \dot{\theta} = \omega_g + b + n_g \\ \dot{b} = n_b \end{bmatrix} \Rightarrow \begin{bmatrix} \dot{\theta} \\ \dot{b} \end{bmatrix} = \begin{bmatrix} 0 & 1 \\ 0 & 0 \end{bmatrix} \begin{bmatrix} \theta \\ b \end{bmatrix} + \begin{bmatrix} \omega_g \\ 0 \end{bmatrix} + \begin{bmatrix} n_\theta \\ n_b \end{bmatrix} \qquad \text{[Formula 12]}$$

Also, when $\tilde{\theta}$ indicates an estimated moving direction and $\tilde{b}$ indicates an estimated gyro drift rate (it is assumed that $\tilde{b}$ is a constant number), an output of a gyro estimation model, i.e., an integrator, can be represented as shown in Formula 13.

$$\begin{bmatrix} \dot{\tilde{\theta}} \\ \dot{\tilde{b}} \end{bmatrix} = \begin{bmatrix} 0 & 1 \\ 0 & 0 \end{bmatrix} \begin{bmatrix} \tilde{\theta} \\ \tilde{b} \end{bmatrix} + \begin{bmatrix} \omega_g \\ 0 \end{bmatrix} \qquad \text{[Formula 13]}$$

Modeling of an error status is performed as follows. First, the error status is defined as shown in Formula 14.

$$\delta\theta(t) = \theta(t) - \tilde{\theta}(t)$$

$$\delta b(t) = b(t) - \tilde{b}(t) \qquad \text{[Formula 14]}$$

When $\theta_m$ indicates a measured moving direction and v indicates Gaussian white noise having distribution $\sigma_v$, an external sensor measurement model can be represented as shown in Formula 15. Here, an external sensor measurement input is selected with one of the compass final azimuth angle and the odometer angular velocity according to the method described above.

$$\theta_m(t) = \theta(t) + v(t) \qquad \text{[Formula 15]}$$

$$\begin{aligned} z(t) &= \theta_m(t) - \tilde{\theta}(t) \\ &= (\theta(t) + v(t)) - (\theta(t) - \delta\theta(t)) \\ &= \delta\theta(t) + v(t) \\ &= \begin{bmatrix} 1 & 0 \end{bmatrix} \begin{bmatrix} \delta\theta(t) \\ \delta b(t) \end{bmatrix} + v(t) \Rightarrow z(t) = Hx(t) + v(t) \end{aligned}$$

An error status model is obtained as shown in Formula 16 by subtracting Formula 12 from Formula 13.

$$\begin{bmatrix} \delta\dot{\theta}(t) \\ \delta\dot{b}(t) \end{bmatrix} = \begin{bmatrix} 0 & 1 \\ 0 & 0 \end{bmatrix} \begin{bmatrix} \delta\theta(t) \\ \delta b(t) \end{bmatrix} + \begin{bmatrix} n_\theta(t) \\ n_b(t) \end{bmatrix} \Rightarrow \dot{x}(t) = \check{A}x(t) + n(t) \qquad \text{[Formula 16]}$$

Figure 11:
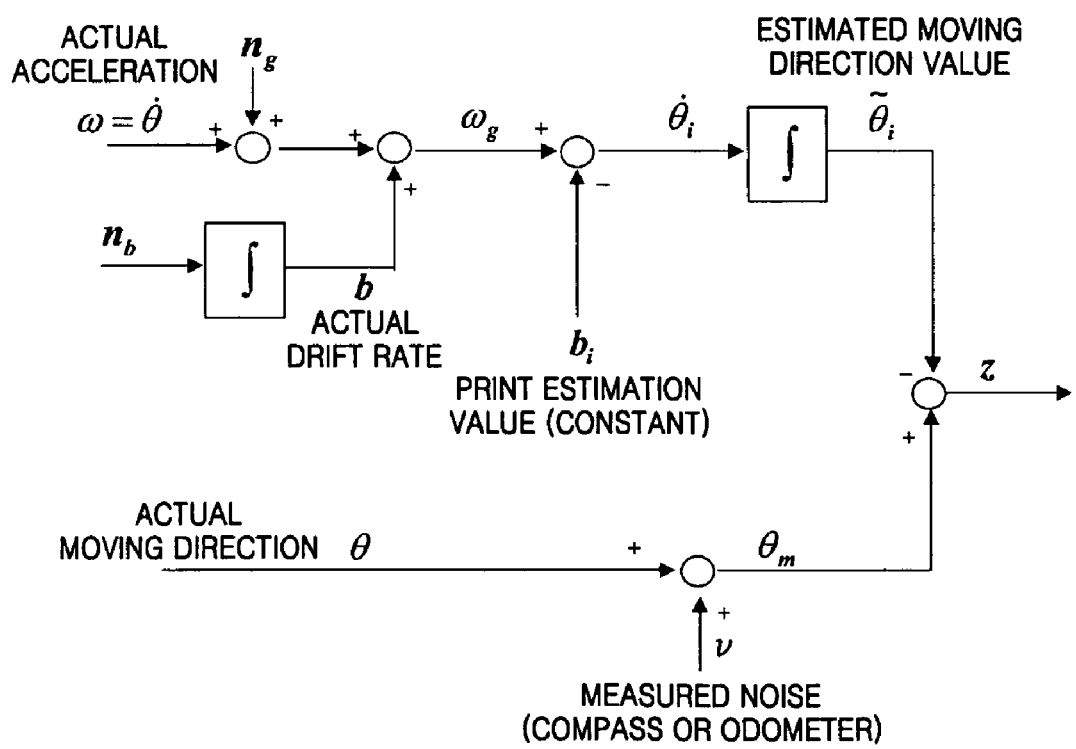
FIG. 11 shows an error status measurement model.

FIG. 11 shows an error status measurement model.

The above model can be represented as a discrete model as follows. A discrete error status can be defined as shown in Formula 17.

$$\delta\theta(t_k) = \theta(t_k) - \tilde{\theta}(t_k), \; \delta b(t_k) = b(t_k) - \tilde{b}(t_k) \qquad \text{[Formula 17]}$$

A discrete form of Formula 12 can be represented as shown in Formula 18.

$$\begin{bmatrix} \theta(t_{k+1}) \\ b(t_{k+1}) \end{bmatrix} = \begin{bmatrix} 1 & \Delta t \\ 0 & 1 \end{bmatrix} \begin{bmatrix} \theta(t_k) \\ b(t_k) \end{bmatrix} + \begin{bmatrix} \Delta t \cdot \omega_g(t_k) \\ 0 \end{bmatrix} + \begin{bmatrix} n_\theta(t_k) \\ n_b(t_k) \end{bmatrix} \qquad \text{[Formula 18]}$$

$$\Delta t \equiv t_{k+1} - t_k$$

A discrete form of Formula 13 can be represented as shown in Formula 19.

$$\begin{bmatrix} \tilde{\theta}(t_{k+1}) \\ \tilde{b}(t_{k+1}) \end{bmatrix} = \begin{bmatrix} 1 & \Delta t \\ 0 & 1 \end{bmatrix} \begin{bmatrix} \tilde{\theta}(t_k) \\ \tilde{b}(t_k) \end{bmatrix} + \begin{bmatrix} \Delta t \cdot \omega_g(t_k) \\ 0 \end{bmatrix} \quad \text{[Formula 19]}$$

Formula 20 can be derived from Formulas 18 and 19.

$$\begin{bmatrix} \delta\theta(t_{k+1}) \\ \delta b(t_{k+1}) \end{bmatrix} = \begin{bmatrix} 1 & \Delta t \\ 0 & 1 \end{bmatrix} \begin{bmatrix} \delta\theta(t_k) \\ \delta b(t_k) \end{bmatrix} + \begin{bmatrix} n_\theta(t_k) \\ n_b(t_k) \end{bmatrix} \Rightarrow x(t_{k+1}) = Ax(t_k) + n(t_k) \quad \text{[Formula 20]}$$

A discrete form of Formula 15 can be represented as shown in Formula 21.

$$z(t_k) = \theta_m(t_k) - \tilde{\theta}(t_k) \quad \Rightarrow z(t_k) = Hx(t_k) + v(t_k) \quad \text{[Formula 21]}$$
$$= \delta\theta(t_k) + v(t_k)$$
$$= \begin{bmatrix} 1 & 0 \end{bmatrix} \begin{bmatrix} \delta\theta(t_k) \\ \delta b(t_k) \end{bmatrix} + v(t_k)$$

A discrete error status Kalman filter is described in detail as follows. Initial conditions can be represented as in Formulas 22 and 23. Formula 22 represents a Gaussian random variable (RV), whose average value is basically 0, and Formula 23 represents distribution of the initial values θ and b.

$$x(t_0) = \begin{bmatrix} 0 & 0 \end{bmatrix}^T \quad \text{[Formula 22]}$$

$$P(t_0) = \begin{bmatrix} \sigma_\theta^2 & 0 \\ 0 & \sigma_b^2 \end{bmatrix} \quad \text{[Formula 23]}$$

A discrete form of the Gaussian noise can be represented as shown in Formula 24.

$$Q = \begin{bmatrix} \sigma_{n_\theta}^2 & 0 \\ 0 & \sigma_{n_b}^2 \end{bmatrix} \Leftarrow E\left\{\begin{bmatrix} n_\theta(t_i) \\ n_b(t_i) \end{bmatrix} \begin{bmatrix} n_\theta(t_j) & n_b(t_j) \end{bmatrix}\right\} = Q(t_i)\delta(t_i - t_j) \quad \text{[Formula 24]}$$

$$R = \sigma_v^2$$

Discrete forms according to temporal updates can be represented as shown in Formulas 25 and 26.

$$\begin{bmatrix} \delta\hat{\theta}(t_{k+1}^-) \\ \delta\hat{b}(t_{k+1}^-) \end{bmatrix} = \begin{bmatrix} 1 & \Delta t \\ 0 & 1 \end{bmatrix} \begin{bmatrix} \delta\hat{\theta}(t_k) \\ \delta\hat{b}(t_k) \end{bmatrix} \quad \text{[Formula 25]}$$

$$P(t_{k+1}^-) = AP(t_k)A^T + Q = \begin{bmatrix} 1 & \Delta t \\ 0 & 1 \end{bmatrix} \cdot P(t_k) \cdot \begin{bmatrix} 1 & 0 \\ \Delta t & 1 \end{bmatrix} + Q \quad \text{[Formula 26]}$$
$$= \begin{bmatrix} P_{11}(t_k) + 2\Delta t P_{12}(t_k) + (\Delta t)^2 P_{22}(t_k) + \sigma_{n_\theta}^2 & P_{12}(t_k) + \Delta t \cdot P_{22}(t_k) \\ P_{12}(t_k) + \Delta t \cdot P_{22}(t_k) & P_{22}(t_k) + \sigma_{n_b}^2 \end{bmatrix}$$

Discrete forms according to measurement updates can be represented as shown in Formulas 27, 28 and 29.

$$K(t_{k+1}) = P(t_{k+1}^-)H^T(HP(t_{k+1}^-)H^T + R)^{-1} \quad \text{[Formula 27]}$$
$$= \frac{1}{P_{11}(t_{k+1}^-) + \sigma_v^2} \begin{bmatrix} P_{11}(t_{k+1}^-) \\ P_{21}(t_{k+1}^-) \end{bmatrix}$$

$$\begin{bmatrix} \delta\hat{\theta}(t_{k+1}) \\ \delta\hat{b}(t_{k+1}) \end{bmatrix} = \begin{bmatrix} \delta\hat{\theta}(t_{k+1}^-) \\ \delta\hat{b}(t_{k+1}^-) \end{bmatrix} + K(t_{k+1}) \cdot \left(z(t_{k+1}) - H \cdot \begin{bmatrix} \delta\hat{\theta}(t_{k+1}^-) \\ \delta\hat{b}(t_{k+1}^-) \end{bmatrix}\right) \quad \text{[Formula 28]}$$
$$= \begin{bmatrix} 1 & \Delta t \\ 0 & 1 \end{bmatrix} \begin{bmatrix} \delta\hat{\theta}(t_k) \\ \delta\hat{b}(t_k) \end{bmatrix} + \begin{bmatrix} K_1(t_{k+1}) \\ K_2(t_{k+1}) \end{bmatrix} \cdot (z(t_{k+1}) - \delta\hat{\theta}(t_{k+1}^-))$$

$$P(t_{k+1}) = P(t_{k+1}^-) - K(t_{k+1}) \cdot H \cdot P(t_{k+1}^-) \quad \text{[Formula 29]}$$
$$= \begin{bmatrix} (1 - K_1(t_{k+1}))P_{11}(t_{k+1}^-) & (1 - K_1(t_{k+1}))P_{12}(t_{k+1}^-) \\ P_{12}(t_{k+1}^-) - K_2(t_{k+1})P_{11}(t_{k+1}^-) & P_{22}(t_{k+1}^-) - K_2(t_{k+1})P_{12}(t_{k+1}^-) \end{bmatrix}$$

Formula 30 can be derived from Formula 19, and Formula 31 can be derived from Formula 28.

$$\begin{bmatrix} \tilde{\theta}(t_{k+1}) \\ \tilde{b}(t_{k+1}) \end{bmatrix} = \begin{bmatrix} 1 & \Delta t \\ 0 & 1 \end{bmatrix} \begin{bmatrix} \tilde{\theta}(t_k) \\ \tilde{b}(t_k) \end{bmatrix} + \begin{bmatrix} \Delta t \cdot \omega_g(t_k) \\ 0 \end{bmatrix} \quad \text{[Formula 30]}$$

$$\begin{bmatrix} \delta\hat{\theta}(t_{k+1}) \\ \delta\hat{b}(t_{k+1}) \end{bmatrix} = \begin{bmatrix} 1 & \Delta t \\ 0 & 1 \end{bmatrix} \begin{bmatrix} \delta\hat{\theta}(t_k) \\ \delta\hat{b}(t_k) \end{bmatrix} + \begin{bmatrix} K_1(t_{k+1}) \\ K_2(t_{k+1}) \end{bmatrix} \cdot \quad \text{[Formula 31]}$$

$$\left(z(t_{k+1}) - \delta\hat{\theta}(t_{k+1}^-)\right)$$

When it is defined that $\hat{\theta} = \tilde{\theta} + \delta\hat{\theta}$, $\hat{b} = \tilde{b} + \delta\hat{b}$, Formula 32 can be obtained from Formula 30 and Formula 31.

$$\begin{bmatrix} \hat{\theta}(t_{k+1}) \\ \hat{b}(t_{k+1}) \end{bmatrix} = \begin{bmatrix} 1 & \Delta t \\ 0 & 1 \end{bmatrix} \begin{bmatrix} \tilde{\theta}(t_k) \\ \tilde{b}(t_k) \end{bmatrix} + \begin{bmatrix} \Delta t \cdot \omega_g(t_k) \\ 0 \end{bmatrix} + \quad \text{[Formula 32]}$$

$$\begin{bmatrix} K_1(t_{k+1}) \\ K_2(t_{k+1}) \end{bmatrix} \cdot \left(z(t_{k+1}) - \delta\hat{\theta}(t_{k+1}^-)\right)$$

$$= \begin{bmatrix} 1 & \Delta t \\ 0 & 1 \end{bmatrix} \begin{bmatrix} \hat{\theta}(t_k) \\ \hat{b}(t_k) \end{bmatrix} + \begin{bmatrix} \Delta t \cdot \omega_g(t_k) \\ 0 \end{bmatrix} +$$

$$\begin{bmatrix} K_1(t_{k+1}) \\ K_2(t_{k+1}) \end{bmatrix} \cdot \left(\theta_m(t_{k+1}) - \tilde{\theta}(t_{k+1}) - \delta\hat{\theta}(t_{k+1}^-)\right)$$

The initial conditions are as shown in Formula 33.

$$\hat{\theta}(t_0) = \theta_m(t_0) \quad \tilde{\theta}(t_0) = \theta_m(t_0) \quad \delta\theta(t_0) = 0$$

$$\hat{b}(t_0) = \tilde{b}(t_0) = \delta b(t_0) = 0 \quad \text{[Formula 33]}$$

Formula 32 is a representative formula of the error status Kalman filter used in an embodiment of the present invention. According to the method described above, an optimal moving direction estimation value $\hat{\theta}(t_{k+1})$ can be obtained by selecting one of the compass azimuth angle and the odometer angular velocity as the measurement input and substituting the measurement input for $\theta_m$ of Formula 32.

The invention can be embodied as computer readable codes on a computer (including all apparatuses having a information processing function) readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices.

As described above, in a sensor fusion method according to an embodiment of the present invention, sensors with a high specification are not necessary. Accordingly, a high performance can be realized with low-price sensors. Also, various unexpected situations that can be dealt with when a mobile body is moved and various kinds of error sources can be estimated. Furthermore, various typical limits included in the Kalman filter, such as that exact information of error characteristics of the sensors is not necessary and that bias, colored noise, and nonsystematic errors can be dealt with, can be overcome. As an ancillary effect, a system fault sensing function can be realized.

Since 3-dimensional angle information is robustly provided by effectively obtaining a yaw angle according to an embodiment of the present invention, the present invention can be applied to all fields requiring estimation of an absolute position and orientation. The applicable fields are as follows: autonomic traveling vehicles, intelligent vehicles, car navigation, medical robots, virtual reality, entertainment, unmanned planes, and personal navigation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A motion estimation method for a mobile body, the method comprising:
   obtaining magnetic field information from compass information of the mobile body;
   comparing each of the magnitude of a magnetic field of a first compass and the magnitude of a magnetic field of a second compass with the magnitude of a geomagnetic field, and determining whether a position of the mobile body belongs to a specific region according to the comparison result; and
   determining a moving direction of the mobile body by determining whether a compass azimuth angle is to be used in estimating the moving direction of the mobile body based on the determination of whether the position of the mobile body belongs to the specific region.

2. The method of claim 1, wherein the specific region is a region in which the geomagnetism dominates.

3. The method of claim 2, wherein the determining of whether a position of the mobile body belongs to a specific region comprises:
   dividing the comparison results into a case where both differences are less than a first threshold value, a case where only one of the two differences is less than the first threshold value, and a case where the two differences are not less than the first threshold value, and determining whether the position of the mobile body belongs to the specific region according to the comparison results.

4. The method of claim 3, wherein the determining of the moving direction of the mobile body comprises:
   if it is determined that the position of the mobile body belongs to the specific region, obtaining a final compass azimuth angle and estimating a heading angle using a Kalman filter using the final compass azimuth angle as a measurement input; and
   if it is determined that the position of the mobile body to the specific region, comparing an angular velocity of a gyro and an angular velocity of an odometer, if the difference is less than a second threshold value, estimating a heading direction using the Kalman filter using a moving direction obtained by the odometer as a measurement input, and if the difference is not less than the second threshold value, estimating the moving direction by integrating the angular velocity of the gyro.

5. The method of claim 3, wherein the determining of the moving direction of the mobile body in the case where each of the magnitude of the magnetic field of the first compass and the magnitude of the magnetic field of the second compass is compared with the magnitude of the geomagnetic field and the two differences are less than the first threshold value comprises:
   obtaining a difference between an azimuth angle of the first compass and an azimuth angle of the second compass;
   if the difference between the azimuth angles is less than a third threshold value, obtaining a compass azimuth angle of the mobile body by varying a weight according to differences between the magnitudes of the magnetic fields of the two compasses and the magnitude of the geomagnetic field; and if the difference between the azimuth angles is not less than the third threshold value, obtaining a difference between an angular velocity of the gyro with respect to the mobile body and each angular velocity with respect to the azimuth angles of the compasses and obtaining the compass azimuth angle of the mobile body according to the magnitudes of the differences.

6. The method of claim 5, wherein the obtaining of the compass azimuth angle of the mobile body by varying a weight comprises:

when $\Delta\theta_{c1}$ indicates the amount of how much an azimuth angle of the first compass is changed for a sampling period, $\Delta\theta_{c2}$ indicates the amount of how much an azimuth angle of the second compass is changed for the sampling period, $\omega_g$ indicates an angular velocity of the gyro, $\Delta t$ indicates a sampling time, $\Delta H_{1E}$ indicates a difference between the magnitude of a magnetic field of the first compass and the magnitude of the geomagnetic field, and $\Delta H_{2E}$ indicates a difference between the magnitude of a magnetic field of the second compass and the magnitude of the geomagnetic field, if a value obtained by multiplying $\Delta H_{1E}$ by $\Delta H_{2E}$ is a negative number, determining a final compass azimuth angle $\theta_c$ as follows;

$$\theta_c \leftarrow \frac{\theta_{c1}|\Delta H_{2E}| + \theta_{c2}|\Delta H_{1E}|}{|\Delta H_{1E}| + |\Delta H_{2E}|}$$

if the value obtained by multiplying $\Delta H_{1E}$ by $\Delta H_{2E}$ is a positive number, determining the final compass azimuth angle $\theta_c$ as follows;

$$\theta_c \leftarrow \frac{\theta_{c1}\Delta H_{2E} - \theta_{c2}\Delta H_{1E}}{\Delta H_{1E} - \Delta H_{2E}}$$

and if the value obtained by multiplying $\Delta H_{1E}$ by $\Delta H_{2E}$ is 0, determining the final compass azimuth angle $\theta_c$ as follows $$\theta_c \leftarrow \frac{\theta_{c1} + \theta_{c2}}{2}$$

7. The method of claim 5, wherein the obtaining of the compass azimuth angle of the mobile body by obtaining the differences between the angular velocities comprises:

when $\Delta\theta_{C1}$ indicates the amount of how much an azimuth angle of the first compass is changed for a sampling period, $\Delta\theta_{c2}$ indicates the amount of how much an azimuth angle of the second compass is changed for the sampling period, $\omega_g$ indicates an angular velocity of the gyro, and $\Delta t$ indicates a sampling time, if the difference between an azimuth angle of the first compass $\theta_{c1}$ and an azimuth angle of the second compass $\theta_{C2}$ is not less than the third threshold value, if $$\left|\frac{\Delta\theta_{c1}}{\Delta t} - \omega_g\right| < \left|\frac{\Delta\theta_{c2}}{\Delta t} - \omega_g\right|$$

is satisfied, determining the azimuth angle of the first compass $\theta_{c1}$ as the final compass azimuth angle $\theta_c$;

if $$\left|\frac{\Delta\theta_{c1}}{\Delta t} - \omega_g\right| < \left|\frac{\Delta\theta_{c2}}{\Delta t} - \omega_g\right|$$

is not satisfied and $$\left|\frac{\Delta\theta_{c2}}{\Delta t} - \omega_g\right| < \left|\frac{\Delta\theta_{c1}}{\Delta t} - \omega_g\right|$$

is satisfied, determining the azimuth angle of the second compass $\theta_{c2}$ as the final compass azimuth angle $\theta_c$; and if $\Delta\theta_{c1}$ and $\Delta\theta_{c2}$ are equal to each other, determining the moving direction angle of the mobile body, $\theta_c$ as the final compass azimuth angle as follows $$\theta_c \leftarrow \frac{\theta_{c1} + \theta_{c2}}{2}.$$

8. The method of claim 3, wherein the determining of the moving direction of the mobile body in the case where each of the magnitude of the magnetic field of the first compass and the magnitude of the magnetic field of the second compass is compared with the magnitude of the geomagnetic field and only one of the two differences is less than the first threshold value comprises:

determining an azimuth angle of the compass having the difference less than the first threshold value as the final compass azimuth angle.

9. The method of claim 8, further comprising calculating an optimum moving direction estimation value of the mobile body by filtering a moving direction angle of the mobile body using the Kalman filter feedbacking an error status.

10. The method of claim 3, wherein the determining of the moving direction of the mobile body in the case where each of the magnitude of the magnetic field of the first compass and the magnitude of the magnetic field of the second compass is compared with the magnitude of the geomagnetic field and the two differences are not less than the first threshold value comprises:

calculating an angular velocity with respect to wheel velocities of the mobile body without using the compass information;

obtaining a difference between a gyro angular velocity of the mobile body and the wheel angular velocity;

if the difference is less than a second threshold value, estimating an optimum moving direction angle using the Kalman filter using a direction obtained by the odometer as a measurement input; and if the difference is not less than the second threshold value, estimating the moving direction angle by integrating the gyro angular velocity without using the Kalman filter.

11. The method of claim 10, wherein the determining of the moving direction angle by integrating the gyro angular velocity further comprises:

if the estimating is performed more times than a fourth threshold value within a predetermined time, then the estimating is ended.

12. The method of claim 5, further comprising calculating an optimum moving direction estimation value of the mobile body by filtering a moving direction angle of the mobile body using the Kalman filter feedbacking an error status.

13. A computer readable medium having recorded thereon a computer readable program for performing the method of claim 1.

14. A motion estimation system for a mobile body in which a gyro, odometers, and compasses are installed, the system comprising:
- a magnetic field calculator calculating the magnitudes of magnetic fields of a first compass and a second compass of the mobile body;
- a magnetic field comparator obtaining differences between the magnitudes of the magnetic fields of the first and second compasses and the magnitude of a geomagnetic field, and comparing the differences with a first threshold value;
- a geomagnetic region determiner determining whether a position of the mobile body belongs to a region where the geomagnetism works according to the comparison result; and
- a moving direction estimator estimating a moving direction of the mobile body by determining whether or not to use azimuth angles of the compasses for direction estimation of the mobile body according to the determination result.

* * * * *